(12) United States Patent
Schön et al.

(10) Patent No.: US 9,086,756 B2
(45) Date of Patent: Jul. 21, 2015

(54) SNAPPING TO TEXT COLUMNS WHILE SCROLLING

(75) Inventors: Johan Schön, Linköping (SE); Torbjörn Söderstedt, Linköping (SE); Niklas Barsk, Linköping (SE)

(73) Assignee: OPERA SOFTWARE ASA, Oslo (NO)

( * ) Notice: Subject to any disclaimer, the term of this patent is extended or adjusted under 35 U.S.C. 154(b) by 829 days.

(21) Appl. No.: 12/621,244

(22) Filed: Nov. 18, 2009

(65) Prior Publication Data

US 2011/0119620 A1      May 19, 2011

(51) Int. Cl.
| G06F 15/00 | (2006.01) |
| G06F 3/00 | (2006.01) |
| G09G 5/00 | (2006.01) |
| G06F 3/041 | (2006.01) |
| G06F 3/0485 | (2013.01) |

(52) U.S. Cl.
CPC ............ *G06F 3/0416* (2013.01); *G06F 3/0485* (2013.01)

(58) Field of Classification Search
CPC   G06F 3/0485; G06F 17/211; G06F 17/30905
USPC .................................. 715/784, 785; 345/173
See application file for complete search history.

(56) References Cited

U.S. PATENT DOCUMENTS

| 7,877,705 | B2* | 1/2011 | Chambers et al. ............ 715/835 |
| 2003/0014445 | A1* | 1/2003 | Formanek et al. ............ 707/526 |
| 2003/0179189 | A1 | 9/2003 | Lira |
| 2006/0048071 | A1 | 3/2006 | Jarrett et al. |
| 2006/0048073 | A1* | 3/2006 | Jarrett et al. ................... 715/784 |
| 2007/0109277 | A1* | 5/2007 | Lira ............... 345/173 |
| 2007/0209017 | A1 | 9/2007 | Gupta et al. |
| 2009/0009366 | A1 | 1/2009 | Chiu et al. |
| 2009/0319888 | A1* | 12/2009 | Oygard ......................... 715/252 |
| 2010/0058240 | A1* | 3/2010 | Bull et al. ...................... 715/830 |
| 2010/0088632 | A1* | 4/2010 | Knowles et al. ............... 715/784 |

OTHER PUBLICATIONS

Hong et al., A real-time web contents adaptation for mobile user, 2006, Lecture Notes in Computer Science (including subseries Lecture Notes in Artificial Intelligence and Lecture Notes in Bioinformatics). p. 249-258.*

* cited by examiner

*Primary Examiner* — Jordany Nunez
(74) *Attorney, Agent, or Firm* — Birch, Stewart, Kolasch & Birch, LLP

(57) ABSTRACT

A method and apparatus for scrolling a electronic document including text, which is displayed on a display screen, including processing user input received via an input device of the computer, detecting an initiating event and pointer movement for a drag operation from the processed user input, scrolling textual content in the document according to the pointer movement of the drag operation, and automatically re-scrolling the textual content to offset a horizontal component of the scrolling of the textual content according to the drag operation.

15 Claims, 12 Drawing Sheets

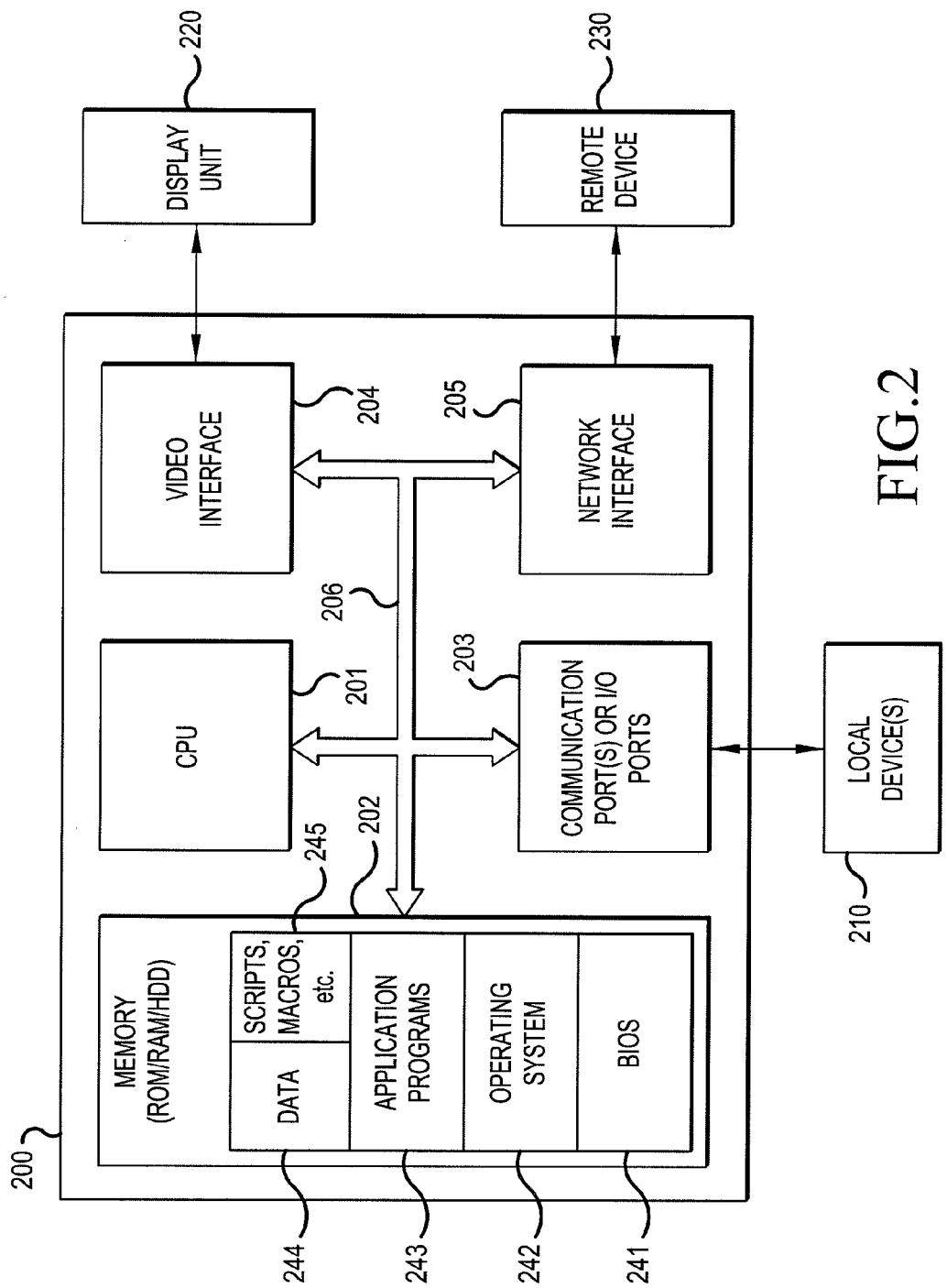

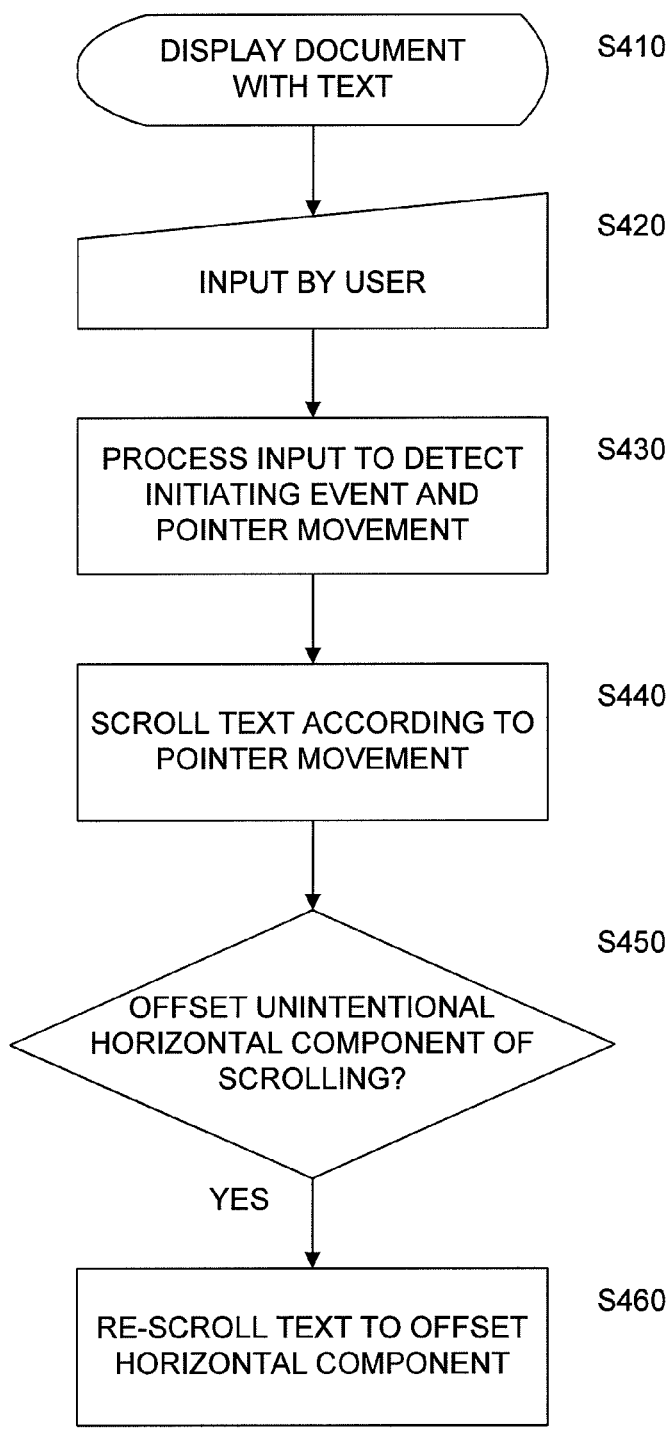

SNAPPING TO TEXT COLUMNS WHILE SCROLLING

FIELD OF THE INVENTION

The invention relates generally to electronic devices for displaying and scrolling text and, particularly, to configuring such devices to automatically scroll a portion of the text back into the viewport.

BACKGROUND OF THE INVENTION

Computer users can use a variety of applications, such as web browsers and word processing programs, to open and read electronic documents comprised of text, and possibly other types of content. Furthermore, specialized computer devices have been developed (e.g., the e-book) whose primary application is to display electronic text to a user. According to a conventional interface, a clicking device, such as a mouse or touchpad, may be used for clicking on a scrollbar and moving it in one of two possible directions (up and down, or left and right) for scrolling the document. Generally, such an interface also allows the user to simply click on a scroll arrow in order to scroll the document in the corresponding direction. A similar type of interface can be implemented using a touch screen, where the user simply touches the scrollbar or the scroll arrow rather than clicking on it.

However, the operation of clicking and moving a scrollbar, or clicking a scroll arrow, becomes more problematic as the size of computer devices (and thus their displays) are made increasingly smaller. As such, another type of interface allows for the use of a "drag" or "panning" operation to scroll the document. Basically, the drag/panning operation is initiated by an event which initiates the dragging operation by "grabbing" the document, coupled with a continuous movement which then "drags" the document in the desired direction. For purposes of this description and the accompanying claims, the term "initiating event" is used to refer to the event initiating the aforementioned drag/panning operation by grabbing the document, while the term "pointer movement" is used to refer to the accompanying movement which drags the document.

For instance, a mouse click may be the initiating event for the dragging operation, while a subsequent movement of the mouse is the pointer movement which drags the document. Alternatively, for a touchscreen interface, the initial touch of a finger or stylus may be the initiating event, and the subsequent movement of the finger/stylus across the display may be the pointer movement causing the document to be dragged.

Also, enhancements have been made to such interfaces to allow for the scrolling operation to continue for some distance, after the pointer movement has terminated, to simulate momentum of the pointer movement. The distance of continued scrolling can be calculated based on any combination of speed, distance, acceleration and power of the pointer movement. This could allow the user to quickly scroll the text using a quick "flick" of his finger in an appropriate direction.

One drawback of interfaces utilizing drag or panning operations is that, while attempting to scroll the text up or down, the user may accidentally scroll the document a little to the left or right, thereby causing the text to be misaligned with the viewport. An example of this will be described herein with respect to FIGS. 1A-1E.

Particularly, FIG. 1A illustrates an example of a document 100 whose content includes title or heading text 105, text 110 in the body of the document, and an image 120. The text 110 in the body of the document 100 is formatted into two columns 110A and 110B, respectively. As shown in FIG. 1B, when the document 100 is electronically displayed on a computing device, the viewport 130 of the device may only be capable of displaying a portion of the text 110A in the left-hand column at a given time. FIG. 1B further shows that a user may attempt to scroll down the text 110A through a drag operation in which the initiating event (e.g., an initial touch of the screen by a finger/stylus) at 140 grabs the document 100, and the pointer movement 150 (e.g., a movement of the finger/stylus in the direction of the arrow) drags the document 100, resulting in another portion of the document being displayed in the viewport 130 as shown in FIG. 1C. The user may continue to scroll by repeating such a drag operation as shown in FIGS. 1C and 1D, resulting in the document 100 being displayed according to FIG. 1E.

However, as illustrated by the arrows in FIGS. 1B-1D, the pointer movements 150 by the user may not be perfectly vertical, but instead may drift a little bit in a horizontal direction, e.g., to the left. As a result, the user might accidentally scroll a portion of the text 110A out of the left-hand side of the viewport 130 as a result of the scrolling, as illustrated in FIG. 1E. Accordingly, this would require an additional horizontal scrolling operation by the user (not shown) merely to align the text column 110A back into the viewport 130.

Thus, it would be advantageous to employ some mechanism to automatically scroll electronic text back into place if it is scrolled slightly horizontally while the user is trying to scroll vertically.

SUMMARY OF THE INVENTION

A system and method is provided for scrolling a electronic document including text, which is displayed on a display screen, including processing user input received via an input device of the computer, detecting an initiating event and pointer movement for a drag operation from the processed user input, scrolling textual content in the document according to the pointer movement of the drag operation, and automatically re-scrolling the textual content to offset a horizontal component of the scrolling of the document according to the drag operation.

According to an exemplary embodiment, the horizontal component of scrolling may be detected as a distance in a horizontal direction, and the automatic re-scrolling may be performed in response to a determination that such distance is within a correction threshold. For instance, the correction threshold may be determined based on the horizontal component and a vertical component of the scrolling that has been performed according to the drag operation.

According to another exemplary embodiment, a horizontal border for a block of the textual content (e.g., text column) may be calculated. In such an embodiment, the automatic re-scrolling may be performed by analyzing the position of such borders in relation to the viewport. A further exemplary embodiment might allow reduce the horizontal speed or rate of scrolling when the edge of the viewport crosses into a horizontal border of the text block being scrolled.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein

FIG. 2 is a diagram illustrating a computing device that can be used for implementing exemplary embodiments of the present invention;

FIG. 4 illustrates a flowchart of a process for automatically re-scrolling a document to re-align text to a viewport after unintentional horizontal scrolling, according to an exemplary embodiment;

Figure 1A:
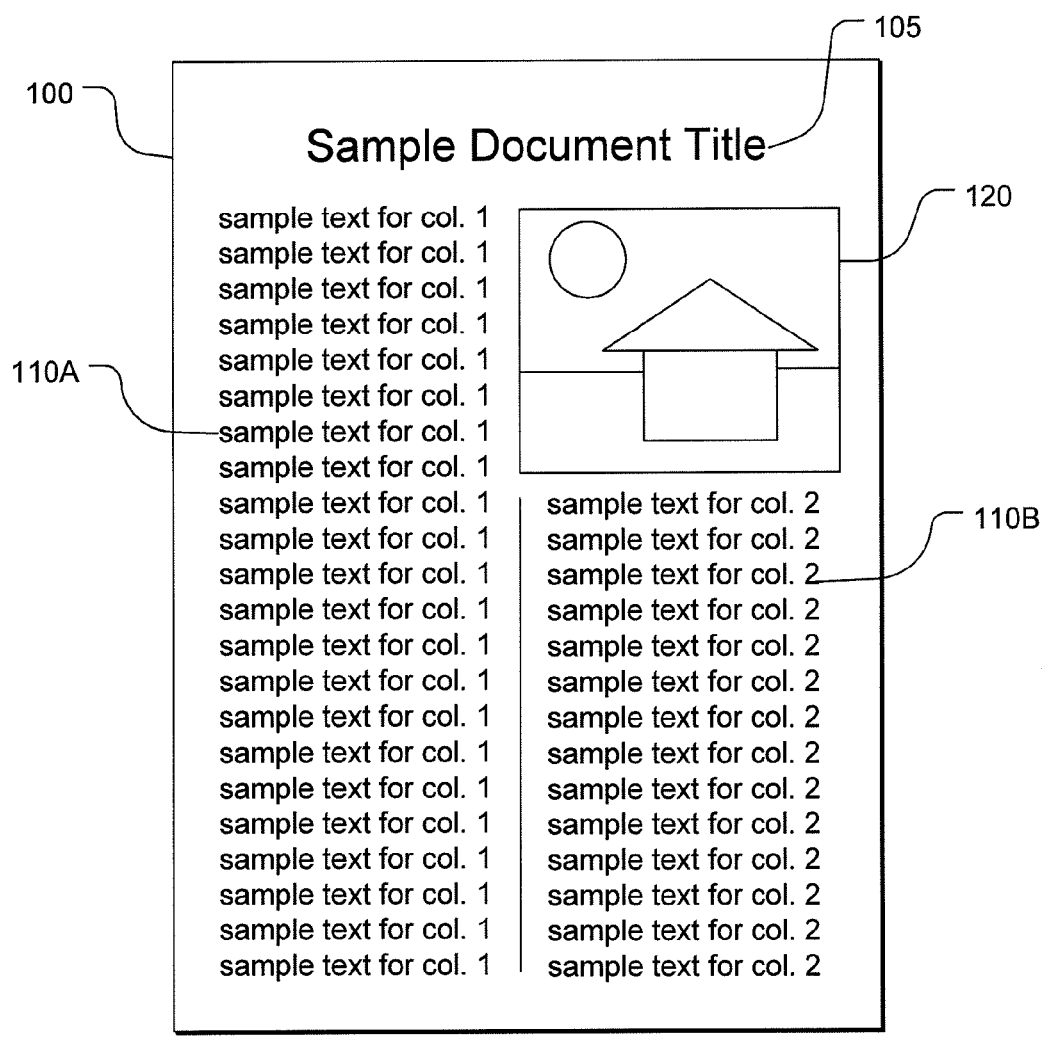
FIG. 1A illustrates an example of an electronic document including text which may be displayed on a computing device.
Figure 1B:
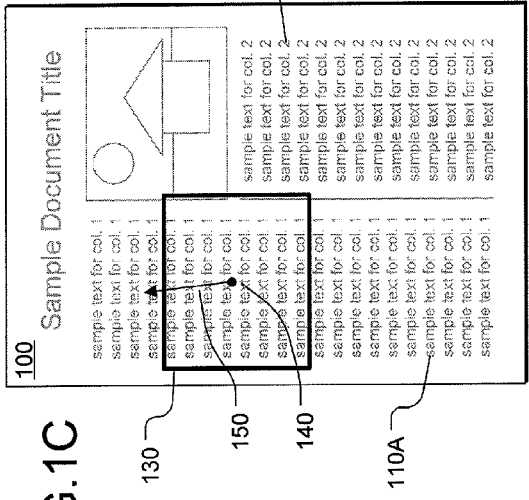
FIGS. 1B-1E illustrate an example of how scrolling by a user may unintentionally move some of the text in the document outside of the viewport of a computing device.
Figure 1D:
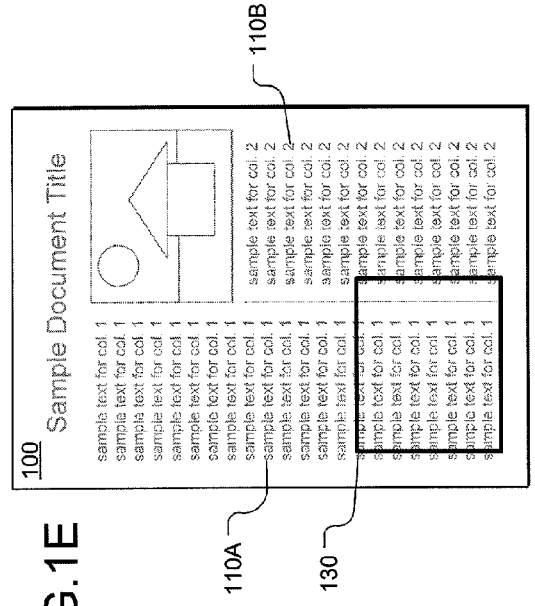
Figure 1C:
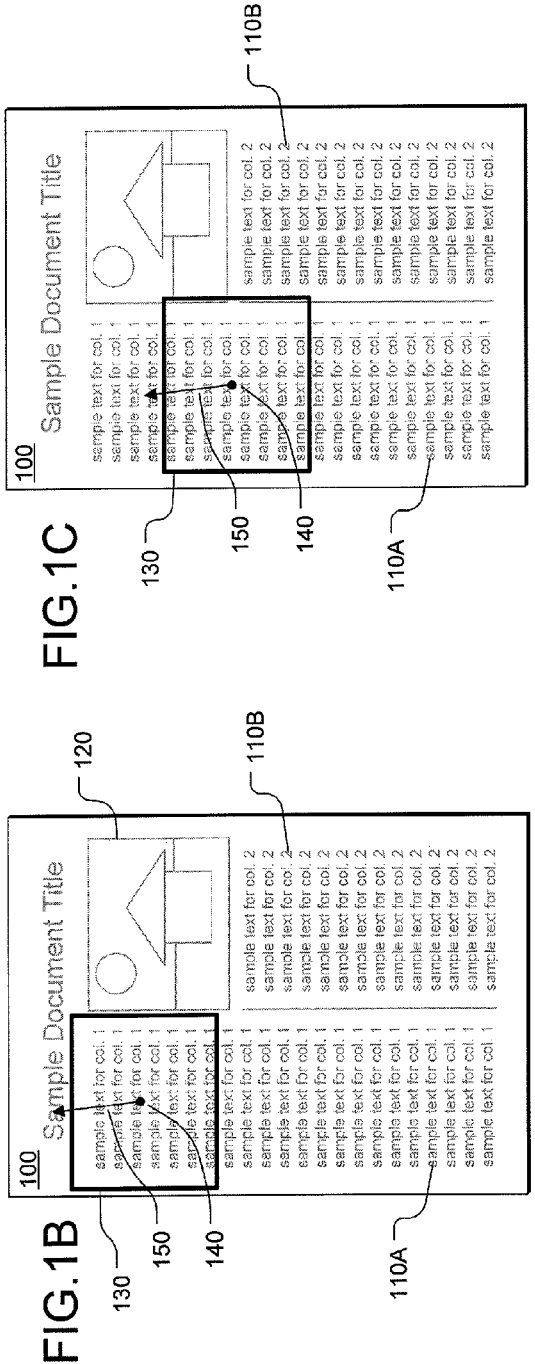
Figure 1E:
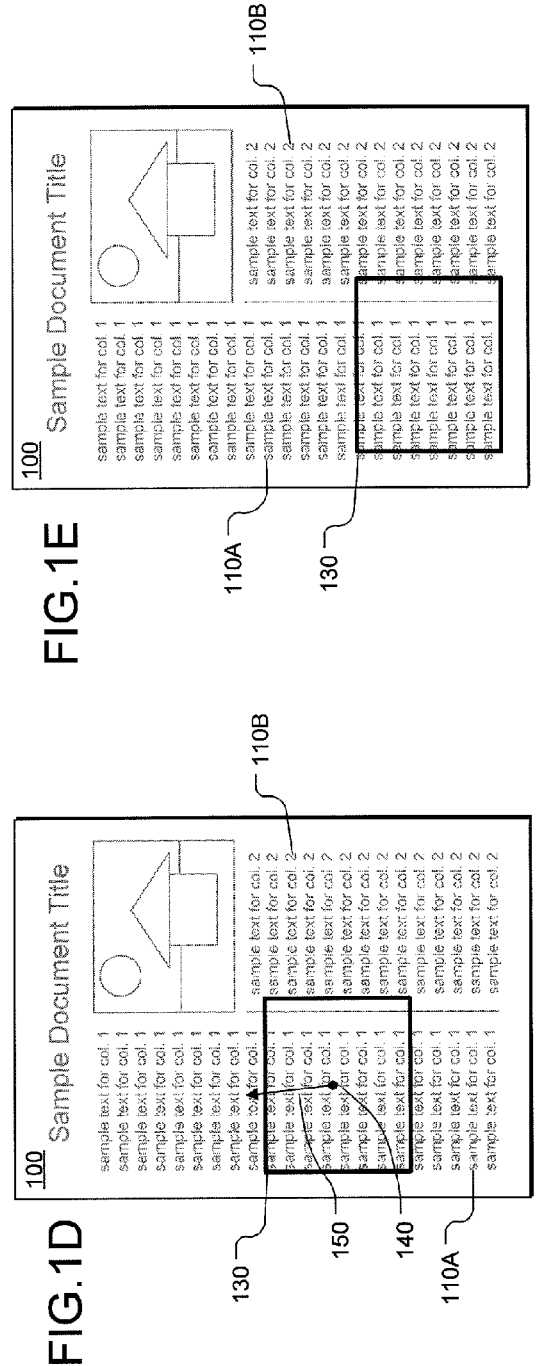

The drawings will be described in detail in the course of the detailed description of the invention.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The present invention is directed toward a computer-implemented method and device to automatically scroll a block of text back into the viewport 130 of a computing device when it is determined that the user unintentionally dragged the text horizontally. This method may be implemented as part of any application (web browser, e-book, word processor) which displays a document comprising text, and allows the user to scroll such document via a drag or panning operation.

For instance, in response to each drag operation for scrolling text in the document, if there is a horizontal component to such scanning, it may be compared to a correction threshold. If the horizontal component with less than the correction threshold, it can be determined that such horizontal movement was unintentional on the user's part thereby causing the text to be automatically re-scrolled in the horizontal direction to its proper alignment with the viewport 130.

However, in another exemplary embodiment, horizontal borders (i.e., left- and right-side borders) can be added to the block of text being scrolled. If a drag operation causes an edge of the viewport 130 to partially enter either horizontal border, the text can be automatically re-scrolled to properly align the viewport 130 with the horizontal borders. Furthermore, the scrolling rate may be slowed down when the viewport 130 edge enters FIG. 2 illustrates a generalized computing device 200 that can be used as an environment for implementing various aspects of the present invention. According to exemplary embodiments, it is contemplated that the computer device 100 may be implemented as a mobile or handheld device, e.g., a personal digital assistant (PDA), mobile telephone, e-book device, etc. However, the principles of the present invention may be applied to other types of computer devices 100, such as desktop computer, laptop computers, and any other type of computer device 100 as will be contemplated by those of ordinary skill in the art.

In FIG. 2, a computing device 200 has various functional components including a central processor unit (CPU) 201, memory 202, communication port(s) 203, a video interface 204, and a network interface 205. These components may be in communication with each other by way of a system bus 206.

The memory 202, which may include computer-readable storage media such as ROM, RAM, flash memory, hard drives, or any other combination of fixed and removable memory, stores the various software components of the system. The software components in the memory 202 may include a basic input/output system (BIOS) 241, an operating system 242, various computer programs 243 including applications and device drivers, various types of data 244, and other executable files or instructions such as macros and scripts 245.

The communication ports 203 may be connected to one or more local devices 210 such as user input devices, a printer, a media player, external memory devices, and special purpose devices such as e.g. a global positioning system receiver (GPS). Communication ports 203, which may also be referred to as input/output ports (I/O), may be any combination of such ports as USB, PS/2, RS-232, infra red (IR), Bluetooth, printer ports, or any other standardized or dedicated communication interface for local devices 210.

As discussed above, the computing device 200 may include one or more user input devices among the local devices 210 of FIG. 2. Among the input device(s) there may be a pointer device, i.e., an input device which allows the user to control the position of a pointer or cursor on the screen. Such pointer devices also allow the user to click on, or perform a similar action for activating a particular function (e.g., select a displayed element) when the pointer/cursor is at a desired screen position. Examples of such pointer devices include an electronic mouse, a trackball device, and a touchpad.

The video interface device 204 is connected to a display unit 220. According to exemplary embodiments, the display unit 220 may include a touch-sensitive screen allowing the display unit 220 to double as a touch-sensitive input device. The touch-sensitive input device aspects of the display unit 220 may be considered as one of the local devices 210 communicating over a communication port 203. Further, for exemplary embodiments in which the computing device 200 is implemented as a PDA, mobile telephone, or other small portable devices, the display will generally be an integrated display such as an LCD display. However, it will be readily apparent that the principles of the present invention may be applied to situations where the display unit 220 is not integrated with the other elements of the computing device 200, e.g., where the display unit 220 is a standalone monitor.

The network interface device 205 provides the computing device 200 with the ability to connect to a network in order to communicate with a remote device 230. The communication network, which in FIG. 2 is only illustrated as the line connecting the network interface 205 with the remote device 230, may be, e.g., a local area network or the Internet. The remote device 230 may in principle be any computing device with similar communications capabilities as the device 200, but may typically be a server or some other unit providing a networked service.

It will be understood that the computing device 200 illustrated in FIG. 2 is not limited to any particular configuration or embodiment regarding its size, resources, or physical implementation of components. For example, more than one of the functional components illustrated in FIG. 2 may be combined into a single integrated unit of the device 200. Also, a single functional component of FIG. 2 may be distributed over several physical units. Other units or capabilities may of course also be present. Furthermore, the device 200 may, e.g., be a general purpose computer such as a PC, or a personal digital assistant (PDA), or even a cellphone or a smartphone.

Figure 3:
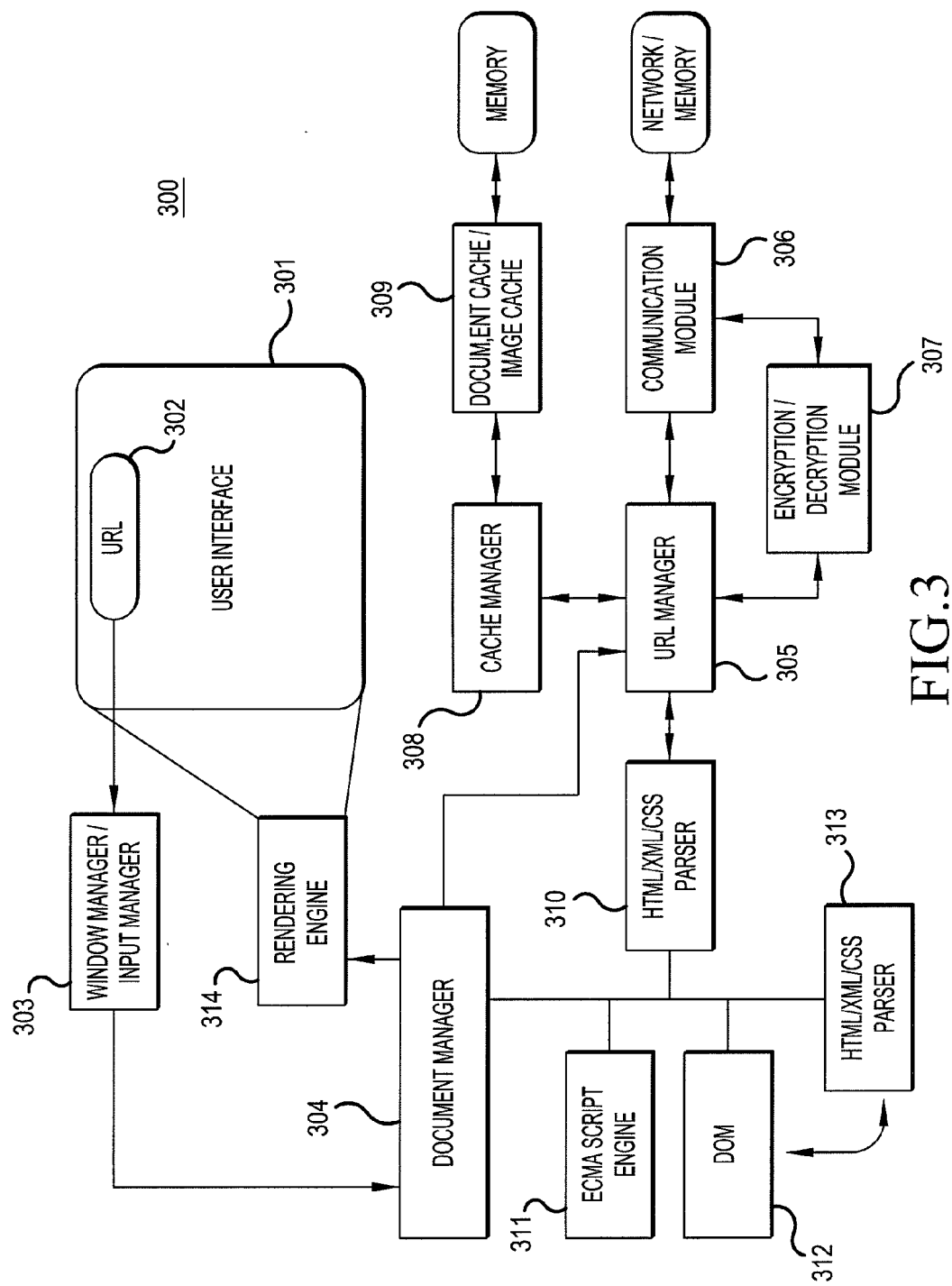
FIG. 3 is diagram illustrating a user agent that may be used in conjunction with exemplary embodiments of the present invention.

In an exemplary embodiment, various aspects of the present invention may be incorporated into, or used in connection with, the components and/or functionality making up a user agent or browser installed as an application on a computing device 200. FIG. 3 shows an example of a number of modules that may be present in such a user agent or browser. The modules will typically be software modules, or otherwise implemented by a programmer in software, and may be executed by the CPU 201. However, it is also possible for any of the modules of FIG. 3 to be implemented as hardware, a combination of hardware and software, or "firmware," as will be contemplated by those skilled in the art.

The user agent or browser 300 presents the user with a user interface 301 that may be displayed on the display unit 220 shown in FIG. 2. The user interface 301 may include an address field 302 where the user may input or select the URL of a document or a service he or she wants the user agent 300 to retrieve. For example, the user may use a keyboard or other type of input device to type in the URL in the address field 302. The address field 302 may also be a link that is displayed and may be activated by the user by touch according to principles of the present invention (alternatively, such a link may also be activated using a pointing device such as a mouse). Alternatively the URL may be specified in the code of a document or script already loaded by the user agent 300.

In any case, the URL may be received by a window and input manager 303 that represents the input part of the user interface 301 associated with, or part of, the user agent 300. The URL may then be forwarded to a document manager 304, which manages the data received as part of the document identified by the URL.

The document manager 304 forwards the URL to a URL manager 305, which instructs a communication module 306 to request access to the identified resource. The communication module 306 may be capable of accessing and retrieving data from a remote device 230 such as a server over a network using the hypertext transfer protocol (HTTP), or some other protocol such as HTTPS or FTP. The communication module 306 may also be capable of accessing data that is stored in local memory 202.

If communication outside the device 200 is required to be encrypted, e.g., as specified by the protocol used to access the URL, encryption/decryption module 307 handles communication between the URL manager 305 and the communication module 306.

The data received by the communication module 306 in response to a request is forwarded to the URL manager 305. The URL manager 305 may then store a copy of the received content in local memory 202 using a cache manager 308 which administers a document and image cache 309. If the same URL is requested at a later time, the URL manager 305 may request it from the cache manager 308, which will retrieve the cached copy from the cache 309 (unless the cached copy has been deleted) and forward the cached copy to the URL manager 305. Accordingly, it may not be necessary to retrieve the same data again from a remote device 230 when the same URL is requested a second time.

The URL manager 305 forwards the data received from the communication port 306 or cache 309 to a parser 310 capable of parsing content such as HTML, XML and CSS. The parsed content may then, depending on the type and nature of the content, be processed further by an ECMAScript engine 311, a module for handling a document object model (DOM) structure 312, and/or a layout engine 313.

This processing of the retrieved content is administered by the document manager 304, which may also forward additional URL requests to the URL manager 305 as a result of the processing of the received content. These additional URL's may, e.g., specify images or other additional files that should be embedded in the document specified by the original URL.

When the data representing the content of the specified document has been processed it is forwarded from the document manager 304 in order to be rendered by a rendering engine 314 and displayed on the user interface 301. According to one possible embodiment, the rendering engine 314 may be responsible for carrying out processing regarding scrolling and automatic re-scrolling of the document, according to principles of the present invention which will be described in more detail below in connection with FIGS. 4-8F. However, in an alternative embodiment, the user interface 301 might be designed to carry out processing with respect to such scrolling and automatic re-scrolling. It is even possible that the user agent 300 could be modified to incorporate another functional component (not shown) to perform such processing.

The various modules thus described are executed by the CPU 201 of the computing device 200 as the CPU 201 receives instructions and data over the system bus(es) 206. The communications module 306 communicates with the remote device 230 using the network interface 205. The functionality of various modules in FIG. 3 may of course be integrated into fewer larger modules. Also, the functionality of a single module in FIG. 3 may be distributed or replicated over several modules.

It will further be understood that, while the user agent 300 described above may be implemented as an application program 243, some of the user agent's 300 functionality may also be implemented as part of the operating system 242 or even the BIOS 241 of the computing device 200. The content received in response to a URL request may be data 244, script 245, or a combination thereof as further described below.

Of course, the present invention is not limited to being implemented by a user agent 300 of a computing device 200. Other types of application programs 243, which are capable of executing on the computing device 200, may be configured to display, scroll, and automatically re-scroll textual documents in accordance with the principles of the present invention described below. Examples of such applications 243 which may be configured to implement the present invention include word processors and e-book applications.

Reference is now made to FIG. 4, which illustrates a flowchart of a process 400 implemented in a computing device 200 for automatically re-scrolling a document to re-align text to a viewport 130 after unintentional horizontal scrolling, according to an exemplary embodiment. As shown in FIG. 4, an electronic document with textual content is displayed on the display unit 220 of the computing device 200 according to operation S410. According to operation S420, the computing device 200 receives user input via an input device, such as a pointer device or touchscreen interface, to perform a drag operation on the document. In operation S430, such input is processed in order to detect the initiating event (e.g., mouse click or initial touch by finger/stylus) and the accompanying pointer movement defining the drag operation. The document including its textual content is thus scrolled in accordance with the pointer movement of the drag operation, according to operation S440. A decision is made in operation S450 as to whether such scrolling of text included an unintentional horizontal component which needs to be corrected. In other words, it is determined whether the user accidentally scrolled the text a little bit to the left or right while attempting to scroll the text up or down, such accidental scrolling needing to be corrected. If operation S450 determines that there was an unintentional horizontal component to the scrolling which needs to be corrected, the textual content is automatically re-scrolled in operation S460 in order to offset such horizontal component, i.e., to re-scroll the text horizontally back to its original (or an otherwise acceptable) alignment with respect to the viewport 130.

Figure 5A:
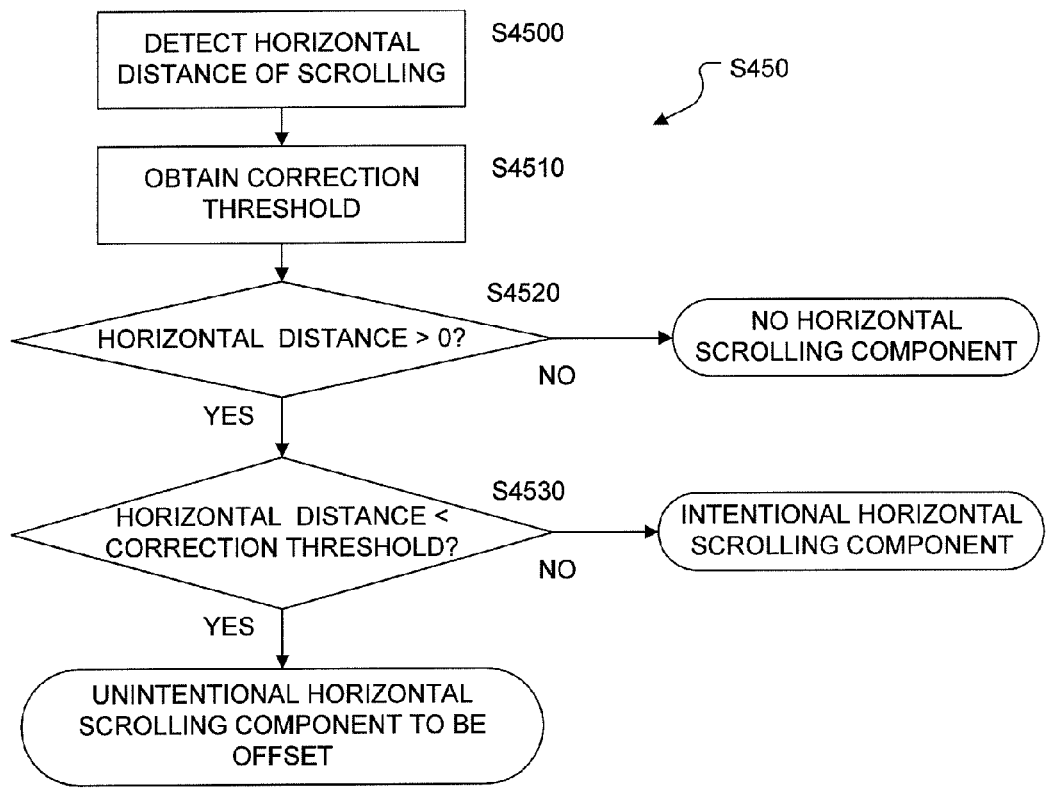
FIGS. 5A-5B illustrate flowcharts for an exemplary embodiment of the process of FIG. 4 utilizing a correction threshold.
Figure 5B:
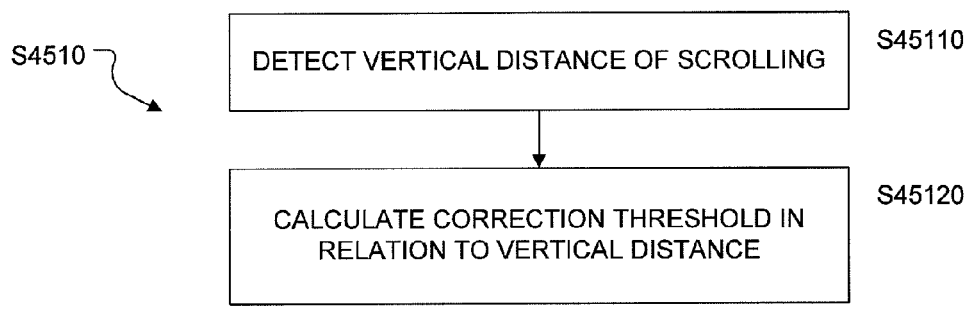

According to an exemplary embodiment, the determination of whether there was an unintentional horizontal component due to the user's drag operation in operation S450 can be performed through the use of a correction threshold. FIGS. 5A-5B illustrate flowcharts for exemplary embodiments of the process of FIG. 4 utilizing a correction threshold.

Particularly, the flowchart of FIG. 5A illustrates a particular exemplary embodiment for implementing operation S450 of FIG. 4. In FIG. 5A, the horizontal component of the scrolling is detected as a horizontal distance in operation S4500. A correction threshold is obtained according to operation S4510. This correction threshold may be static, i.e., a constant value programmed into the application 243 implementing the process 400. Alternatively, the correction threshold may be variable, as will be explained below in connection with FIG. 5B. Referring again to FIG. 5A, operation S4520 determines whether or not there is a horizontal component to the scrolling, i.e., whether the detected horizontal distance is a value greater than 0. If so, another decision is made in operation S4530 as to whether the detected horizontal distance is less than the correction threshold.

Particularly, operation S4530 makes an attempt to determine whether or not the user actually intended to scroll horizontally across the textual content. For instance, considering the example document illustrated in FIG. 1A, if user was trying to scroll horizontally from the text column 110A to look at the image 120, it could be assumed that the user would drag the document a significant distance to the left, i.e., that the horizontal distance of such scrolling would be at least a certain amount. Therefore, according to operation S4530, it can be determined whether or not the user was intending to horizontally scroll the document by comparing the detected horizontal distance to the correction threshold. As such, if the horizontal distance is less than the correction threshold, a determination can be made that the horizontal component of the scrolling per the user's drag operation was unintentional, and should be offset according to operation S460 of FIG. 4.

As described above, the correction threshold may be a static value. For example, it may be determined based on a characteristic of the display unit 220 of the computing device 200. For instance, the correction threshold may be pre-set to an appropriate amount based on screen size or the dots-per-inch (DPI) of the display unit 220, using such procedures as will be readily apparent to persons ordinarily skilled in the art.

However, in a further, the correction threshold may be variable, dependent on other factors which might indicate whether or not the user intended only to vertically scroll the text. For instance, such a factor may include a ratio between the vertical and horizontal distances scrolled as a result of the drag operation. FIG. 5B includes a flowchart illustrating such an embodiment.

Particularly, FIG. 5B illustrates an exemplary embodiment for implementing operation S4510 of FIG. 5A, i.e., obtaining the correction threshold, based on the horizontal and vertical components. In operation S45110, the vertical distance of the scrolling resulting from the user's drag operation is detected. According to operation S45120, the correction threshold may be calculated in relation to the detected vertical distance. For instance, the correction threshold may be proportional to the vertical distance, or have some other relation causing it to be smaller as a smaller vertical distance is detected. This could even be accomplished by taking a default correction threshold (e.g., determined based on DPI of the display unit 220) and multiplying it by a factor which increases as the vertical distance increases. It should be noted that the calculation of the correction threshold in operation S45120 may be accomplished in any manner which makes it easier to judge the horizontal scrolling component to be intentional as it becomes relatively larger with respect to the vertical component.

Referring again to FIG. 4, the use of a correction threshold is merely but one way to determine whether automatic re-scrolling of the text is necessary according to operation S450. According to another exemplary embodiment, the application of a horizontal border to the left and/or right sides of a block of textual content (e.g., column of text) may be used in operation S450, to determine whether it is necessary to automatically re-scroll the text in order to offset an unintentional horizontal component of text scrolling.

Figure 6A:
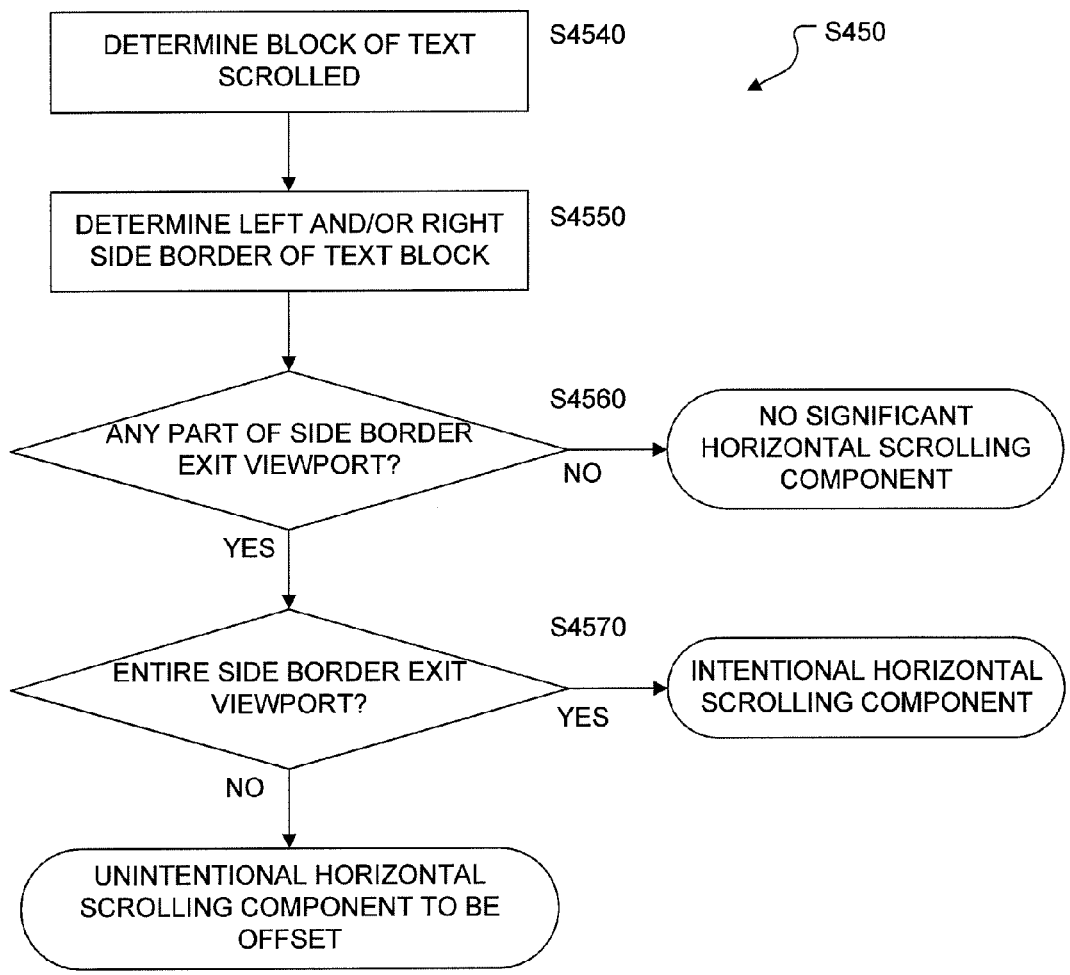
FIGS. 6A-6C illustrate flowcharts for particular exemplary embodiments of the process of FIG. 4 utilizing a horizontal border for textual content.

FIG. 6A illustrates an alternative exemplary embodiment for implementing operation S450 of FIG. 4, using at least one horizontal border applied to the side(s) of the textual content of the document. According to operation S4540, a determination is made regarding the block of text scrolled according to the user's drag operation. For example, the layout of the document may include one or more columns of text, and a determination may be made in as to which column is being viewed and scrolled according to the drag operation. In structured documents, e.g., HTML and other markup language documents, it might be appropriate to analyze the semantic constructs (elements) in the underlying code in operation S4540 to determine the appropriate text block/column.

It should further be noted that principles of the present invention are not limited to application to text blocks or columns, but could also be applied to other types of content blocks of HTML or markup language documents, including images and tables. In other words, if the user is attempting to scroll down a large image or table, the principles of the present invention could be used to automatically re-scroll the image/table back into horizontal alignment with the viewport 130. As such, operation S4540 could be adapted to look for any type of content block being scrolled, e.g., any type of content inside tags such as <p> or <div>, not just text. Thus, even though the term "text block," "text column," and the like are used throughout this description, the use of such terms is not intended to limit the present invention, but instead the present invention could be applied to blocks containing other types of content.

Figure 7B:
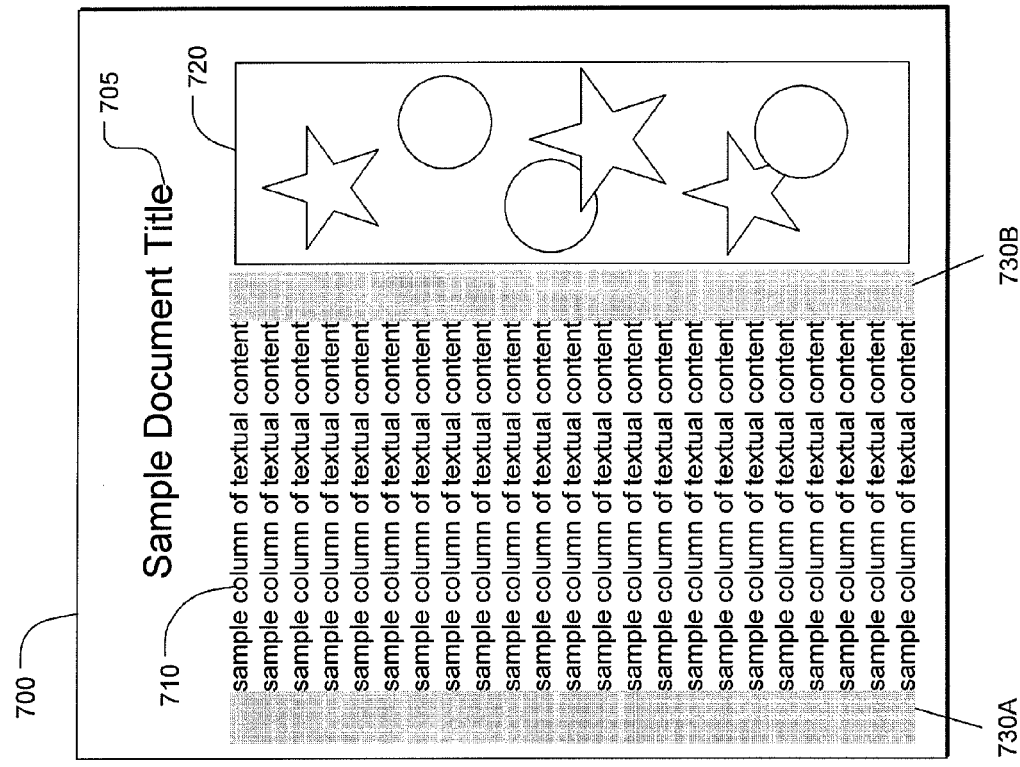
FIGS. 7A-7B illustrate an example of an electronic document including a block of text, and the application of a horizontal border in connection therewith, according to an exemplary embodiment.

Referring again to FIG. 6A, according to operation S4550, at least one horizontal border is determined for the text block or column. For instance, a border may be applied to the left side, the right side, or both sides of the text column. An example of using both left and right horizontal borders is illustrated in FIGS. 7A and 7B.

Figure 7A:
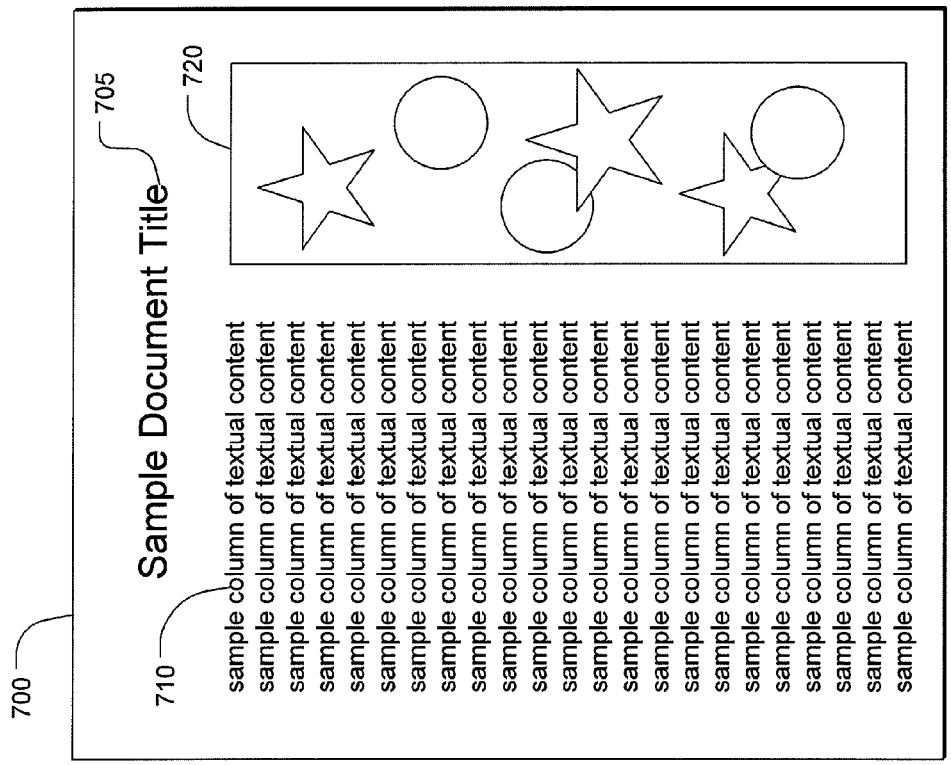

Particularly, FIG. 7A illustrates another example of an electronic document 700 including heading text 705, a column of textual content 710, and an image 720. Applying operations S4540 and S4550 (FIG. 6A) to document 700 (FIG. 7A), a horizontal border 730 could be determined for either side of text column 710 as shown in FIG. 7B. Particularly, FIG. 7B illustrates horizontal borders 730A and 730B being applied to the left and right sides, respectively, of the text column 710. While horizontal borders 730A and 730B are shown in FIG. 7B (and subsequent figures) as shaded borders, the shading is only illustrated to facilitate understanding. It is not necessary to modify the display of document 700 as a result of determining or calculating horizontal borders 730; the use of such borders 730 may be made transparent to the user.

Furthermore, it should be noted that the width of a horizontal border 730 may be determined or calculated based on the characteristics of the display unit 220 of the computing device 200, such as screen size or DPI. Screen size and DPI of different types of computing devices 200 can be widely varied, even among different models of devices 200 by the same manufacturer. If principles of the present invention described herein were carried out on different devices 200 of varying DPI's, by setting horizontal borders 730 to the same width in terms of number of pixels, performance results for such devices 200 could vary. Thus, setting the width of horizontal borders 730 according to the DPI of each computing device 200 could help ensure a more consistent standard of performance regardless of the screen size.

Referring again to FIG. 6A, a determination is made in operation S4560 as to whether a horizontal border 730 at least partially exited the viewport 130, as a result of the drag operation and resultant scrolling. If the answer is no, a decision can be made that the horizontal component of the scrolling (if any) is not significant, and thus does not need to be offset by re-scrolling. If, however, a horizontal border 730 was determined to have exited the viewport 130 due to scrolling, processing continues to operation S4570.

In particular, operation S4570 determines whether an entire horizontal border 730 exited the viewport 130. If the text scrolling caused an entire horizontal border 730 to exit viewport 130, a decision can be made that the horizontal scrolling component was large enough to be intentional by the user, and thus there is no need to automatically re-scroll the text block. On the other hand, if operation S4570 determines that a horizontal border 730 did not entirely exit the viewport 130, but instead one of the horizontal borders 730 only partially exited the viewport 130, it can be decided that the user unintentionally scrolled the text to the left or right side, and that re-scrolling is necessary to offset this unintentional scrolling according to operation S460 of FIG. 4.

Together operations S4560 and S4570 determine whether the scrolling of text by the drag operation resulted in the left or right edge of the viewport 130 getting stuck in the corresponding horizontal border 730. To illustrate an example of this, reference is now made to FIGS. 8A-8C. Particularly, these figures illustrate a sequence where the process illustrated in FIG. 6A would decide that automatic re-scrolling is necessary, in order to offset an unintentional horizontal scrolling with respect to the example document 700 illustrated in FIG. 7A.

Figure 8A:
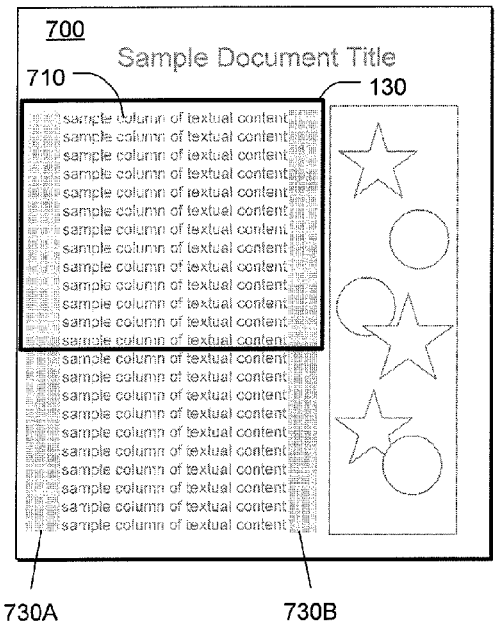
FIGS. 8A-8F illustrate an example of how a horizontal border of a block of text may be used to implement principles of the present invention, according to an exemplary embodiment.
Figure 8B:
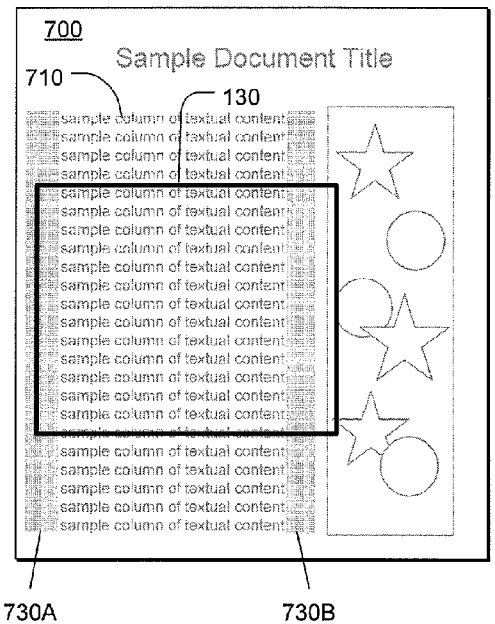
Figure 8C:
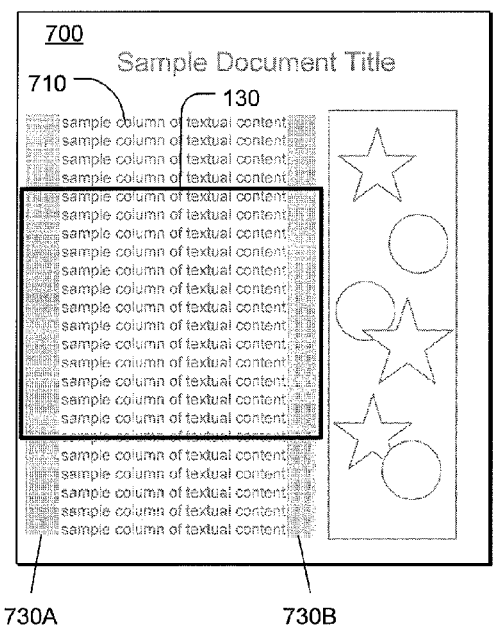

Specifically, FIG. 8A illustrates the positioning of the document 700 with respect to the viewport 130 of a computing device 200, when receiving an initiating event for a drag operation by the user. As illustrated in this figure, horizontal borders 730A and 730B are calculated for the column of text 710, which is the text block determined to be within the viewport 130. FIG. 8B illustrates the subsequent positioning of the document 700 (and text column 710) in relation to the viewport 130, resulting from scrolling the column of text 710 in accordance with the drag operation. As shown FIG. 8B, the scrolling caused the left horizontal border 730A to exit the left side of the viewport 130, thus resulting in an affirmative decision in operation S4560 of FIG. 6A. However, FIG. 8B also shows that neither horizontal border 730A nor horizontal border 730B entirely exited the viewport 130 during the scrolling, thus resulting in a negative decision in operation S4570 of FIG. 6A. Accordingly, FIG. 8C shows that the text column 710 is automatically re-scrolled to be properly aligned horizontally with the viewport 130, as a result of operation S460 of FIG. 4.

Figure 8D:
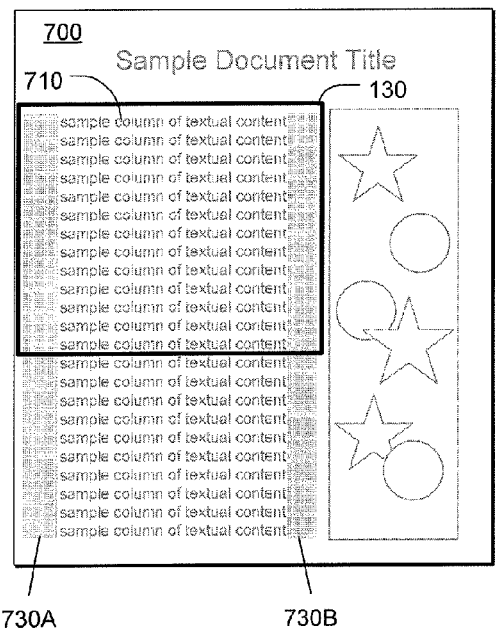
Figure 8E:
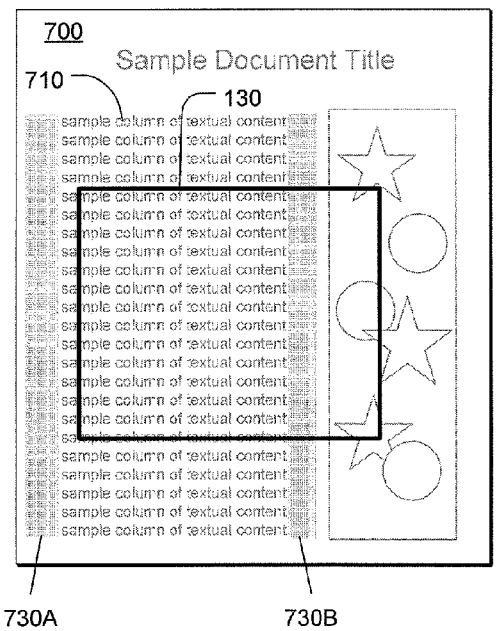
Figure 8F:
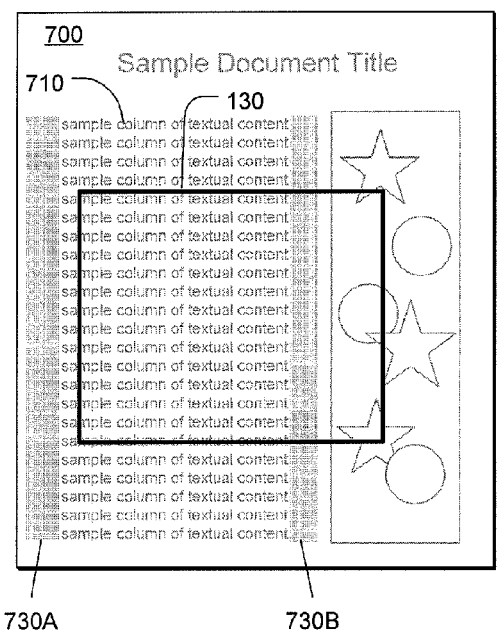

In contrast to FIGS. 8D-8F illustrate an example involving example document 700, in which the process illustrated in FIG. 6A would decide not to automatically re-scroll the text 710 in response to scrolling by the user. Specifically, FIG. 8D illustrates the positioning of the document 700 and viewport 130, prior to the drag operation (similar to FIG. 8A). FIG. 8E illustrates the subsequent positioning of the document 700 in relation to the viewport 130, resulting from the scrolling by the user. While FIG. 8E shows that the scrolling caused the left horizontal border 730A to exit the left side of the viewport 130, it further shows that the entire horizontal border 730A also exited the viewport 130 during scrolling. As a result, even both operations S4560 and S4570 of FIG. 6A would be decided in the affirmative, thus indicating that the horizontal scrolling was intentional by the user. Accordingly, as shown in FIG. 8F, automatic re-scrolling is not performed.

While exemplary embodiments of the invention described thus far relate to the automatic re-scrolling of text to offset unintentional horizontal displacement as a result of scrolling by the user, other aspects of the present invention may be implemented to help prevent the user from accidentally scrolling text out of the viewport 130.

For instance, a speed or rate of scrolling can be slowed down as the left or right edge of the viewport 130 enters a respective horizontal border 730. This means that, while the scrolling of operation S440 (FIG. 4) causes the left or right edge of the viewport 130 to traverse a corresponding horizontal border 730, the speed of such scrolling may be automatically reduced. The scrolling speed may be slowed down in the horizontal direction only or, alternatively, in both horizontal and vertical directions. Generally, the rate or speed of scrolling is defined in terms of number of pixels scrolled per number of pixels detected in the pointer movement.

Figure 6B:
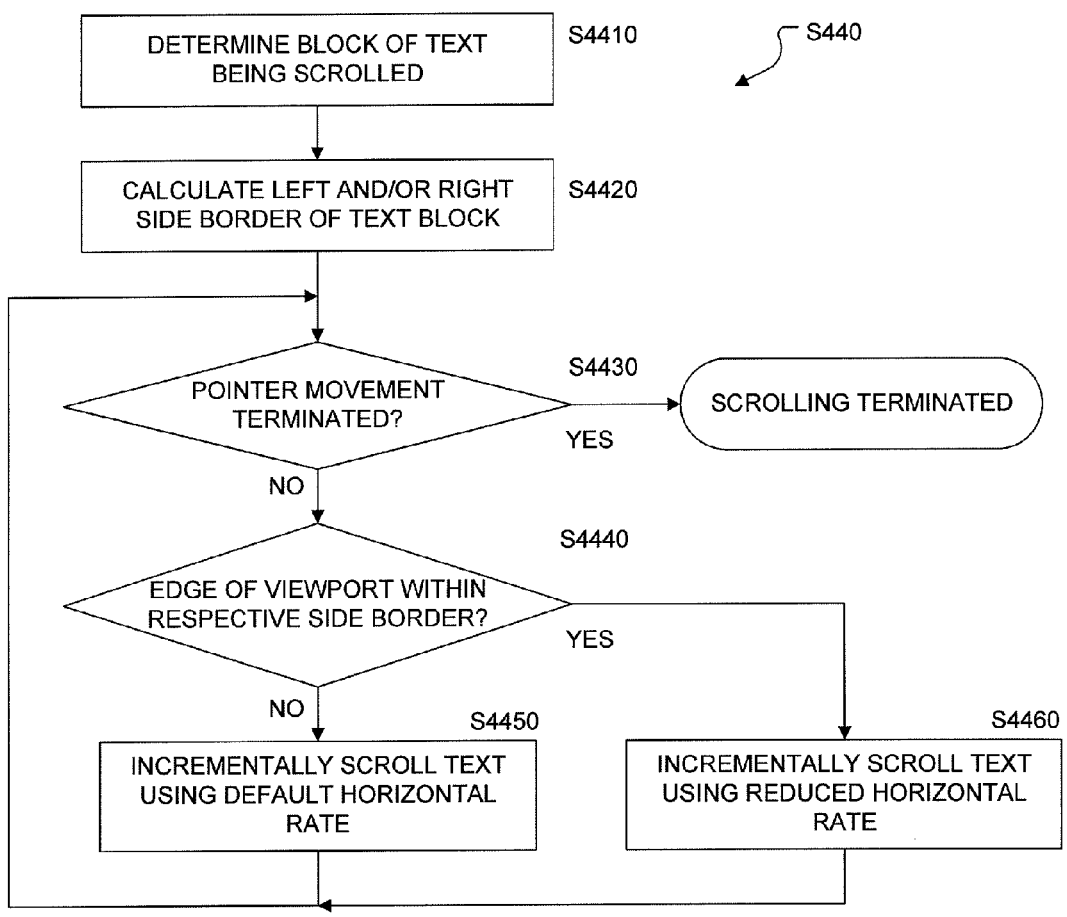

FIG. 6B illustrates an exemplary embodiment of implementing operation S440 of FIG. 4 so that the horizontal speed of scrolling is slowed down as the left or right edge of the viewport 130 traverses a corresponding horizontal border 730. According to operation S4410, a determination is made as to the block of text being scrolled at the time the drag operation is initiated by the user (e.g., column of text 710 in FIG. 8A). In operation S4420 of FIG. 6B, a horizontal border 730 is calculated for the left and/or right side of the text block (e.g., horizontal borders 730A and 730B in FIG. 8A). As the text 710 is incrementally scrolled according to the pointer movement of the drag operation, i.e., until operation S4430 of FIG. 6B determines that the pointer movement has terminated, it is repeatedly determined whether the left or right edge of the viewport 130 is within a corresponding one of the left and right horizontal borders 730A and 730B. If not, scrolling is maintained at the default horizontal rate according to operation S4450. However, if the left/right edge of the viewport 130 is currently within the left/right horizontal border 730A/730B, the horizontal rate of scrolling is reduced according to operation S4460 of FIG. 6B.

Based on this feature, the horizontal borders 730 can be thought of as "ridges" on the sides of the text 710. As such, the slow-down that occurs as each horizontal border 730 is being scrolled out of the viewport 130 would correspond to the "steepness" of the ridge.

Referring again to FIG. 6B, the amount by which the speed of horizontal scrolling is reduced in operation S4460 can be based on the direction of scrolling. Thus, the ridges (i.e., horizontal borders 730) can be made steeper as it becomes clearer that it is the user's intent to vertically scroll the text based on the direction of scrolling. I.e., if the user's pointer movement is clearly in the horizontal direction, rather than vertical, the steepness of the ridges may be kept low to make it easier for the user to scroll horizontally.

Furthermore, as the user performs a series of drag operations in order to scroll the text, the overall direction of scrolling may be used to determine the steepness of the ridges. For instance, during each drag operation, the overall direction of scrolling may be determined in relation to where the initiating event of the first drag operation occurred.

Figure 6C:
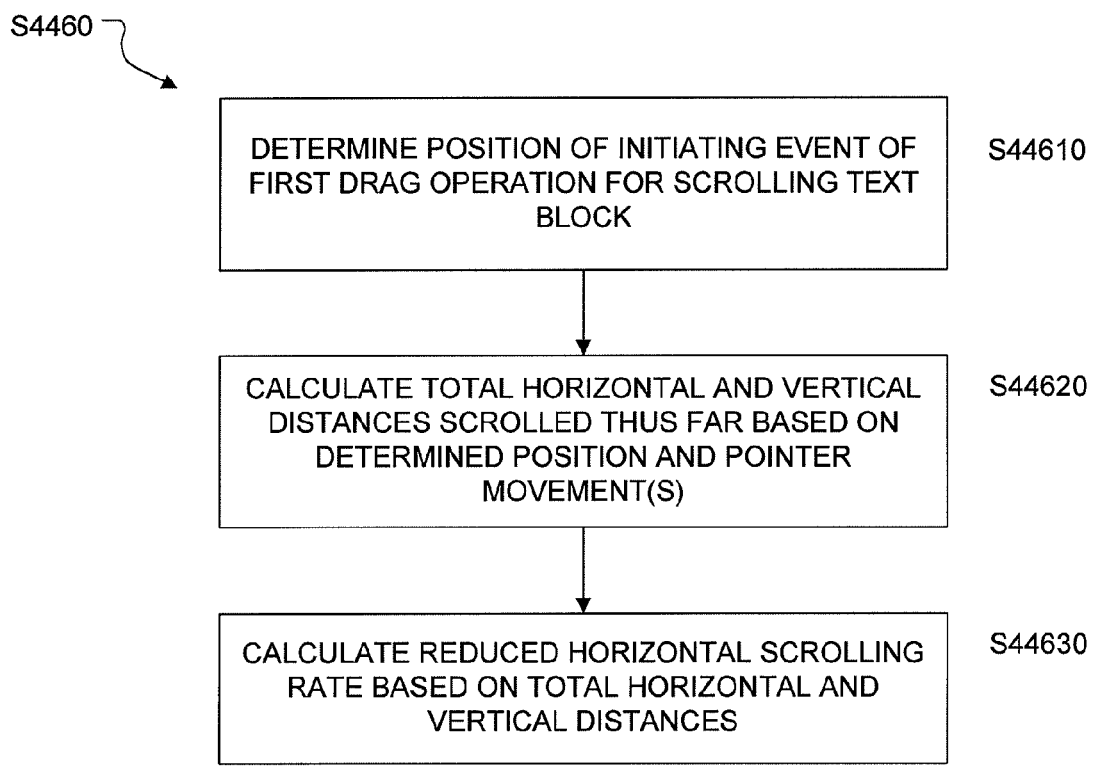

FIG. 6C illustrates a particular exemplary embodiment in which operation S4460 of FIG. 6B reduces the horizontal rate of scrolling based on the overall scrolling direction, in response to a series of drag operations by the user. In FIG. 6C, operation S44610 determines the positions of the initiating event for the first drag operation in the series. Operation S44620 calculates the total horizontal and vertical distances scrolled since the start of the series of drag operations, based on the initiating event position determined in operation S44610 the subsequent pointer movements up to and including the current drag operation. In operation S44630, a reduced horizontal rate is calculated based on the total horizontal and vertical distances.

For example, operation S44630 of FIG. 6C can be accomplished by selecting between two (or more) different values which can be used for reducing the horizontal scrolling rate, depending on the overall direction of scrolling since the start of the series of drag operations. Particularly, if the overall direction of scrolling is primarily horizontal based on the total horizontal and vertical directions calculated (e.g., if the total horizontal distance is longer than the total vertical distance), the horizontal scrolling rate may be reduced according to a first preset value. On the other hand, if the overall direction of scrolling is primarily vertical (e.g., the total vertical distance is longer than the total horizontal distance), another preset value may be applied to reduce the horizontal scrolling rate to an even larger degree.

There may be several different ways to perform such a selection. Below is an example of computer code to implement such a selection between preset reduced rates:

```
int speedDivider = abs(totalScrollX) > abs(totalScrollY)
    ? DIVIDER_X
    :DIVIDER_X * VERTICAL_MULTIPLIER;
int reduced_horiz_rate = default_horiz_rate / speedDivider
``` where:
reduced_horiz_rate is the reduced horizontal scrolling rate;
default_horiz_rate is the default horizontal scrolling rate;
speedDivider is the factor by which the default horizontal scrolling rate is reduced, according to a division operation;
totalScrollX and totalScrollY represents total scrolling distances in the horizontal direction (x axis) and vertical direction (y axis), respectively, since the series of drag operations started;
DIVIDER_X represents a factor by which the horizontal scrolling rate is to be reduced; and
VERTICAL_MULTIPLIER represents an additional factor by which the horizontal scrolling rate is to be further reduced, if the overall direction of scrolling is vertical, rather than horizontal.

To explain the above example, it will be assumed that DIVIDER_X is preset to the value 2, and VERTICAL_MULTIPLIER is preset to the value 5. Under these conditions, if the user's overall direction of scrolling is primarily horizontal as the left or right edge of the viewport 130 is scrolled into the corresponding horizontal border 730, the reduced rate of horizontal scrolling is calculated as half of the default horizontal scrolling rate, i.e., default_horiz_rate divided by 2. Conversely, in this example, if the user's overall direction of scrolling is primarily vertical (e.g., with an accidental horizontal component) when the edge of the viewport enters the horizontal border 730, the reduced rate of horizontal scrolling is calculated as one-tenth of the default rate, i.e., default_horiz_rate/(2*5).

It should be noted that FIGS. 6B and 6C are merely illustrative of exemplary embodiments, and other methods can be implemented to calculate or modify the steepnesses of the horizontal borders 730 consistent with the spirit and scope of the present invention. Also, the implementation of each horizontal border 730 as a ridge with a steepness is not required, but rather may be implemented an optional enhancement.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

The invention claimed is:
1. A method of scrolling an electronic document including multiple columns of text, which is displayed on a computing device, the method comprising:
utilizing at least one processor in the computing device to perform the following:
process user input received via an input device;
detect an initiating event and pointer movement for a drag operation from the processed user input;
scroll textual content in the document according to the pointer movement of the drag operation;
analyze semantic constructs in the underlying markup language code to identify which of the multiple columns of text is being viewed and scrolled by the user;
calculate a border width for the identified column of text, and apply a border of the calculated width on the left and/or right side of the identified column of text;
determine whether the scrolling of the textual content caused at least part of the applied left or right side border of the identified column of text to exit a viewport of a display screen of the electronic device;
decrease a horizontal speed of the scrolling of the textual content, which is performed in accordance with the pointer movement, when an edge of the applied left or right side border of the identified column of text exits the viewport; and
after the decrease to the horizontal speed is applied to the scrolling of the textual content, detect the horizontal component of the scrolling of the textual content as a distance in a horizontal direction; and determine whether the distance is within a correction threshold, wherein the automatic re-scrolling is performed in response to a determination that the distance is less than the correction threshold, wherein the drag operation is part of a series of one or more drag operations detected by the at least one processor from the processed user input, wherein the at least one processor decreases the horizontal speed of the scrolling of the textual content by:

determining a total vertical distance and a total horizontal distance scrolled since the initiating event of the first drag operation the series; and analyzing the total vertical and horizontal distances, and wherein, in decreasing the horizontal speed of the scrolling of the textual content, the at least one processor further:

calculates a factor by which the horizontal speed of the scrolling of the textual content is to be decreased, such that the factor is calculated as a first preset value when the determined total horizontal distance exceeds the determined total vertical distance, and the factor is calculated as a second preset value when the determined total vertical distance exceeds the total horizontal distance, the second preset value being greater than the first preset value; and while continuing to scroll the textual content, scales down the horizontal speed of the scrolling according to the pointer movement of the current drag operation by the calculated factor.

2. The method of claim 1, wherein the at least one processor is further utilized to:

detect a vertical component of the scrolling of the textual content, the vertical component being determined as a distance in a vertical direction, wherein the correction threshold is determined based on the horizontal and vertical components of the scrolling of the textual content.

3. The method of claim 1, wherein the automatic re-scrolling is performed based on the determination of whether the scrolling of the textual content caused at least part of the applied left or right side border to exit the viewport.

4. The method of claim 3, wherein the automatic re-scrolling is performed in response to determining that a portion less than the entire left or right side border exited the viewport as a result of the scrolling of the textual content.

5. The method of claim 1, wherein the border width is calculated based on the dots-per-inch (DPI) at which the document is displayed by the electronic device.

6. An apparatus comprising:

a display screen configured to display a document including multiple columns of text;

an input device configured to receive user input; and at least one processor programmed to:

process the user input received via the input device;

detect an initiating event and pointer movement for a drag operation from the processed user input;

scroll textual content in the document according to the pointer movement of the drag operation;

analyze semantic constructs in the underlying markup language code to identify which of the multiple columns of text is being viewed and scrolled by the user;

calculate a border width for the identified column of text, and apply a border of the calculated width on the left and/or right side of the identified column of text;

determine whether the scrolling of the textual content caused at least part of the applied left or right side border of the identified column of text to exit a viewport of the display screen;

decrease a horizontal speed of the scrolling of the textual content, which is performed in accordance with the pointer movement, when an edge of the applied left or right side border of the identified column of text exits the viewport; and after the decrease to the horizontal speed is applied to the scrolling of the textual content, detect a horizontal component of the scrolling of the textual content as a distance in a horizontal direction;

determine whether the distance is within a correction threshold; and perform automatic re-scrolling to offset the horizontal component in response to a determination that the distance is less than the correction threshold, wherein the drag operation is part of a series of one or more drag operations detected by the at least one processor from the processed user input, wherein the at least one processor is further programmed to decrease the horizontal speed of the scrolling of the textual content by:

determining a total vertical distance and a total horizontal distance scrolled since the initiating event of the first drag operation in the series; and analyzing total vertical and horizontal distances, and wherein the at least one processor is further programmed to in decreasing the horizontal speed of the scrolling of the textual content, calculate a factor by which the horizontal speed of the scrolling of the textual content is to be decreased, such that the factor is calculated as a first preset value when the determined total horizontal distance exceeds the determined total vertical distance, and the factor is calculated as a second preset value when the determined total vertical distance exceeds the total horizontal distance, the second preset value being greater than the first preset value; and while continuing to scroll the textual content, scale down the horizontal speed of the scrolling according to the pointer movement of the current drag operation by the calculated factor.

7. The apparatus of claim 6, wherein the at least one processor is further programmed to:

detect a vertical component of the scrolling of the textual content, the vertical component being determined as a distance in a vertical direction, wherein the correction threshold is determined based on the horizontal and vertical components of the scrolling of the textual content.

8. The apparatus of claim 6, wherein the automatic re-scrolling is performed based on the determination of whether the scrolling of the textual content caused at least part of the applied left or right side border to exit the viewport.

9. The apparatus of claim 8, wherein the automatic re-scrolling is performed in response to the at least one processor determining that a portion less than the entire applied left or right side border exited the viewport as a result of the scrolling of the textual content.

10. The apparatus of claim 8, wherein the border width is calculated based on the dots-per-inch (DPI) at which the document is displayed on the display screen.

11. A non-transitory computer-readable storage medium having embodied thereon a program that, when executed by a computer, causes it to perform a method of scrolling an electronic document including multiple columns of text, which is displayed on a display screen of the computer, the method comprising:

processing user input received via an input device of the computer;

detecting an initiating event and pointer movement for a drag operation from the processed user input;

scrolling textual content in the document according to the pointer movement of the drag operation;

analyzing semantic constructs in the underlying markup language code to identify which of the multiple columns of text is being viewed and scrolled by the user;

calculating a border width for the identified column of text, and apply a border of the calculated width on the left and/or right side of the identified column of text;

determining whether the scrolling of the textual content caused at least part of the applied left or right side border of the identified column of text to exit a viewport of a display screen of the electronic device;

decreasing a horizontal speed of the scrolling of the textual content, which is performed in accordance with the pointer movement, when an edge of the applied left or right side border of the identified column of text exits the viewport; and after the decreasing of the horizontal speed of the scrolling of the textual content, detecting a horizontal component of the scrolling of the textual content as a distance in a horizontal direction;

determining whether the distance is within a correction threshold; and performing automatic re-scrolling to offset the horizontal component in response to a determination that the distance is less than the correction threshold, wherein the drag operation is part of a series of one or more drag operations detected by the at least one processor from the processed user input, wherein the method decreases the horizontal speed of the scrolling of the textual content by:

determining a total vertical distance and a total horizontal distance scrolled since the initiating event of the first drag operation in the series; and analyzing the total vertical and horizontal distances, and wherein, in decreasing the horizontal speed of the scrolling of the textual content, the method further comprises:

calculating a factor by which the horizontal speed of the scrolling of the textual content is to be decreased, such that the factor is calculated as a first preset value when the determined total horizontal distance exceeds the determined total vertical distance, and the factor is calculated as a second preset value when the determined total vertical distance exceeds the total horizontal distance, the second preset value being greater than the first preset value; and while continuing to scroll the textual content, scaling down the horizontal speed of the scrolling according to the pointer movement of the current drag operation by the calculated factor.

12. The computer-readable storage medium of claim 11, wherein the method further comprises:

detecting a vertical component of the scrolling of the textual content, the vertical component being determined as a distance in a vertical direction, wherein the correction threshold is determined based on the horizontal and vertical components of the scrolling of the textual content.

13. The computer-readable storage medium of claim 11, wherein the automatic re-scrolling is performed based on the determination of whether the scrolling of the textual content caused at least part of the applied left or right side border to exit the viewport.

14. The computer-readable storage medium of claim 13, wherein the automatic re-scrolling is performed in response to determining that a portion less than the entire applied left or right side border exited the viewport as a result of the scrolling of the textual content.

15. The method of claim 13, wherein the border width is calculated based on the dots-per-inch (DPI) at which the document is displayed by the computer.

* * * * *